(12) United States Patent
Gopalakrishnan et al.

(10) Patent No.: US 11,934,706 B2
(45) Date of Patent: Mar. 19, 2024

(54) SMART RELOCATION SCAN OPTIMIZATION

(71) Applicant: Western Digital Technologies, Inc., San Jose, CA (US)

(72) Inventors: Raghavendra Gopalakrishnan, Karnataka (IN); Kalpit Bordia, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 176 days.

(21) Appl. No.: 17/559,802

(22) Filed: Dec. 22, 2021

(65) Prior Publication Data

US 2023/0195389 A1 Jun. 22, 2023

(51) Int. Cl.
G06F 3/06 (2006.01)

(52) U.S. Cl.
CPC .......... *G06F 3/0679* (2013.01); *G06F 3/0604* (2013.01); *G06F 3/0655* (2013.01)

(58) Field of Classification Search
CPC ..... G06F 3/0604; G06F 3/0655; G06F 3/0679
See application file for complete search history.

(56) References Cited

U.S. PATENT DOCUMENTS

| | | |
|---|---|---|
| 7,536,500 B2 | 5/2009 | Wang |
| 8,738,846 B2 | 5/2014 | Son et al. |
| 9,927,998 B2 | 3/2018 | Lee et al. |
| 10,061,695 B2 | 8/2018 | Shin et al. |
| 2008/0250195 A1* | 10/2008 | Chow ................ G06F 12/0246 711/E12.098 |
| 2011/0066808 A1* | 3/2011 | Flynn ................. G06F 12/0246 711/E12.001 |
| 2014/0208004 A1* | 7/2014 | Cohen ................ G06F 12/0246 711/103 |
| 2019/0266079 A1 | 8/2019 | R et al. |

OTHER PUBLICATIONS

Keun Soo Yim et al., "A Fast Start-Up Technique for Flash Memory Based Computing Systems", ACM Symposium on Applied Computing, 2005, pp. 843-849.

* cited by examiner

*Primary Examiner* — Jane W Benner
(74) *Attorney, Agent, or Firm* — ArentFox Schiff LLP

(57) ABSTRACT

Aspects of a storage device provide an optimized data relocation scanning process which significantly reduces a number of page reads performed during a block relocation scan by consolidating logical addresses for multiple FMUs in a single FMU. The storage device includes a memory comprising a block including pages and FMUs, and a controller that is configured to store, in one of the FMUs, logical addresses for multiple FMUs. The controller is further configured, in response to a data relocation command, to read the logical addresses from the FMU, to determine at least one of the read logical addresses is mapped to a current FMU in a L2P mapping table, and to relocate data stored at the valid logical addresses in response to the determination. As a result, latency and power consumption associated with data relocation may be significantly reduced and storage device performance may thus be improved.

19 Claims, 10 Drawing Sheets

SMART RELOCATION SCAN OPTIMIZATION

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices generally have a minimum length of data that a controller may manage when reading from and writing to flash memory. This minimum length of data may be referred to as a flash management unit (FMU). For instance, a typical flash storage device may have an FMU size of 4 KB. Moreover, blocks of flash memory may have page sizes which are larger than the FMU size. For example, a single die of flash memory may include a page size of 16 KB within a block of single-level cells.

Each FMU includes a header which stores metadata for that FMU. Generally, the flash storage device stores metadata individually in FMU headers. For example, each FMU header of a block may include a single logical address mapped to data stored in that FMU. As a result, when the flash storage device performs a block scanning process during data relocation, the flash storage device ends up reading every FMU in the block for the stored metadata. Naturally, this process is time-consuming and power-intensive with significant impact to storage device performance.

SUMMARY

One aspect of a storage device is disclosed herein. The storage device includes a memory and a controller. The memory comprises a block including a plurality of pages and a plurality of FMUs, where each of the pages includes one or more of the FMUs. The controller is configured to store, in one of the FMUs, logical addresses for multiple ones of the FMUs of the block. The controller is further configured, in response to a data relocation command, to read the logical addresses from the one of the FMUs, to determine at least one of the logical addresses read from the block is mapped to a current FMU in a logical-to-physical (L2P) mapping table, and to relocate data stored at the at least one of the logical addresses in response to the determination.

Another aspect of a storage device is disclosed herein. The storage device includes a memory and a controller. The memory comprises a block including a plurality of pages and a plurality of FMUs, where each of the pages includes one or more of the FMUs. The controller is configured to store, in one of the FMUs, a starting logical address and a logical address range encompassing multiple ones of the FMUs of the block. The controller is further configured, in response to a data relocation command, to read the starting logical address and the logical address range from the one of the FMUs, to determine whether at least one logical address indicated by the starting logical address and the logical address range is mapped to a current FMU in a L2P mapping table, and to relocate data stored at the at least one logical address in response to the determination.

A further aspect of a storage device is disclosed herein. The storage device includes a memory and a controller. The memory comprises a block including a first page, a second page, first FMUs, and second FMUs, where the first page includes the first FMUs and the second page includes the second FMUs. The controller is configured to store, in one of the first FMUs, a starting logical address and a logical address range encompassing multiple ones of the first FMUs of the block, and to store in one of the second FMUs, logical addresses for multiple ones of the second FMUs of the block. The controller is further configured to read the starting logical address and the logical address range from the one of the first FMUs during a first data relocation, and to read the logical addresses from the one of the second FMUs during a second data relocation It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
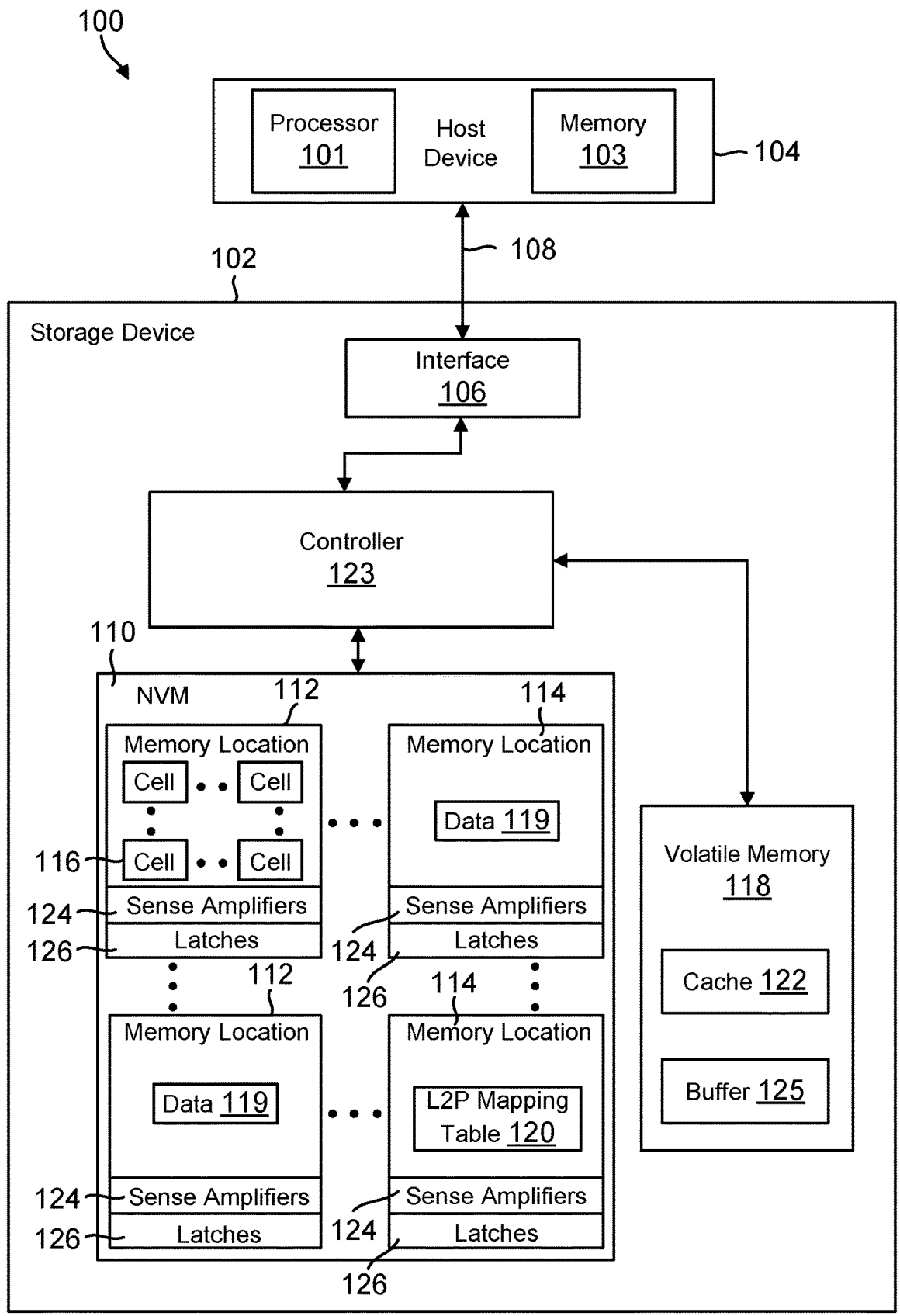
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Generally, when performing data relocation, the storage device divides a block into multiple ranges of flash management units (FMUs), and the storage device scans each FMU range for metadata in the header of each FMU. The scanned metadata may include logical addresses originally mapped to those FMUs. After the storage device compiles a list of the logical addresses, the storage device verifies whether the mapping of each logical address to a corresponding FMU has been changed (e.g., became invalid) as a result of a data overwrite or other data update. If the storage device identifies any invalid logical address mappings in corresponding FMUs, the storage device flags those FMUs as invalid. The storage device may then relocate the valid FMUs (e.g., the FMUs which were not marked as invalid) to another block, after which the storage device may erase the block to remove the invalid FMUs.

This process may be quite time-consuming and power-intensive, especially when the storage device is scanning data in a jumbo block (a superblock or metablock spanning multiple physical blocks across dies or planes) for data relocation purposes. For example, if the storage device is scanning a jumbo block having a total size of 48 MB, where each logical address is 8 bytes in length, each FMU is 4 KB in length, and each page is 16 KB in length (e.g., spanning 4 FMUs), the storage device may end up performing 3,072 page reads (senses) to scan and identify logical addresses in the headers of approximately 12,288 FMUs. This scanning process alone can take a large amount of time (e.g., 15 ms in this example) and a large amount of power (e.g., 2,153 Watts (W) assuming a 512 GB storage device capacity), thereby significantly impacting relocation time and power consumption.

To improve the scanning process, the storage device of the present disclosure may significantly reduce the number of page reads (senses) during a block relocation scan. In one example, when a controller of the storage device obtains logical addresses from a host in host write commands, instead of storing each logical address in the header of an individual FMU as previously described, the controller may consolidate or accumulate the logical addresses in volatile memory, and then the controller may store, flush or dump the consolidated logical addresses in one or more FMUs. For instance, in the aforementioned example of a jumbo block including 12,288 FMUs, where each FMU stores 4 KB of data and each logical address spans 8 bytes in length, the controller may consolidate and store 12,288 logical addresses in 24 FMUs (rather than in 12,288 individual FMUs). It should be noted these numbers are merely examples and may change depending on the block size, FMU range size, controller RAM constraints, or other factors, although in any event may still result in a reduced number of FMUs (or pages) which store logical addresses.

As a result, when the controller performs a relocation scan of the block or jumbo block to identify the logical addresses of all FMUs as previously described, the controller may simply read the pages including only the FMUs that store the consolidated logical addresses, rather than inefficiently reading every FMU. For instance, in the aforementioned example of the 48 MB jumbo block where each 16 KB page includes four 4 KB FMUs, the controller may end up performing only 6 page reads for the 24 FMUs to identify the 12,288 consolidated logical addresses to be verified for data relocation, rather than performing 3,072 page reads as previously described. In this way, the number of page reads during relocation may be greatly reduced, significantly saving relocation time and power consumption. For instance, the controller may complete a relocation scan of a 48 MB jumbo block in a reduced time of 0.029 ms (compared to 15 ms) and with reduced power consumption at 4.3 W (compared to 2153 W), thereby resulting in a 99.8% improvement to storage device performance. Additionally, since the controller may read pages including consolidated FMU metadata from different dies or planes of a jumbo block in parallel, relocation time and power consumption may be further improved as a result.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, Hiper-LAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a buffer 125 (e.g., a write buffer or a read buffer) for temporarily storing data (or metadata). While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
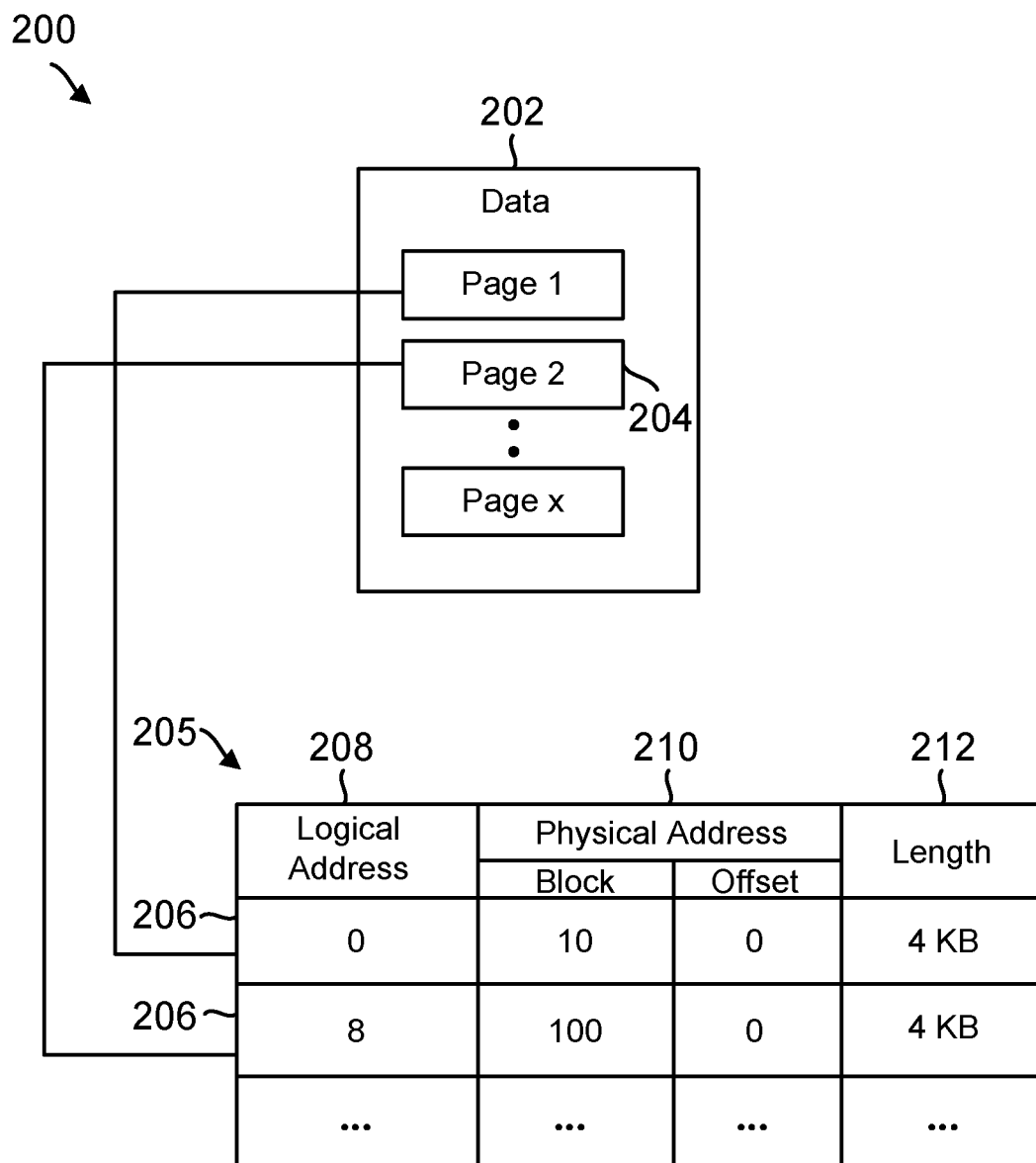
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
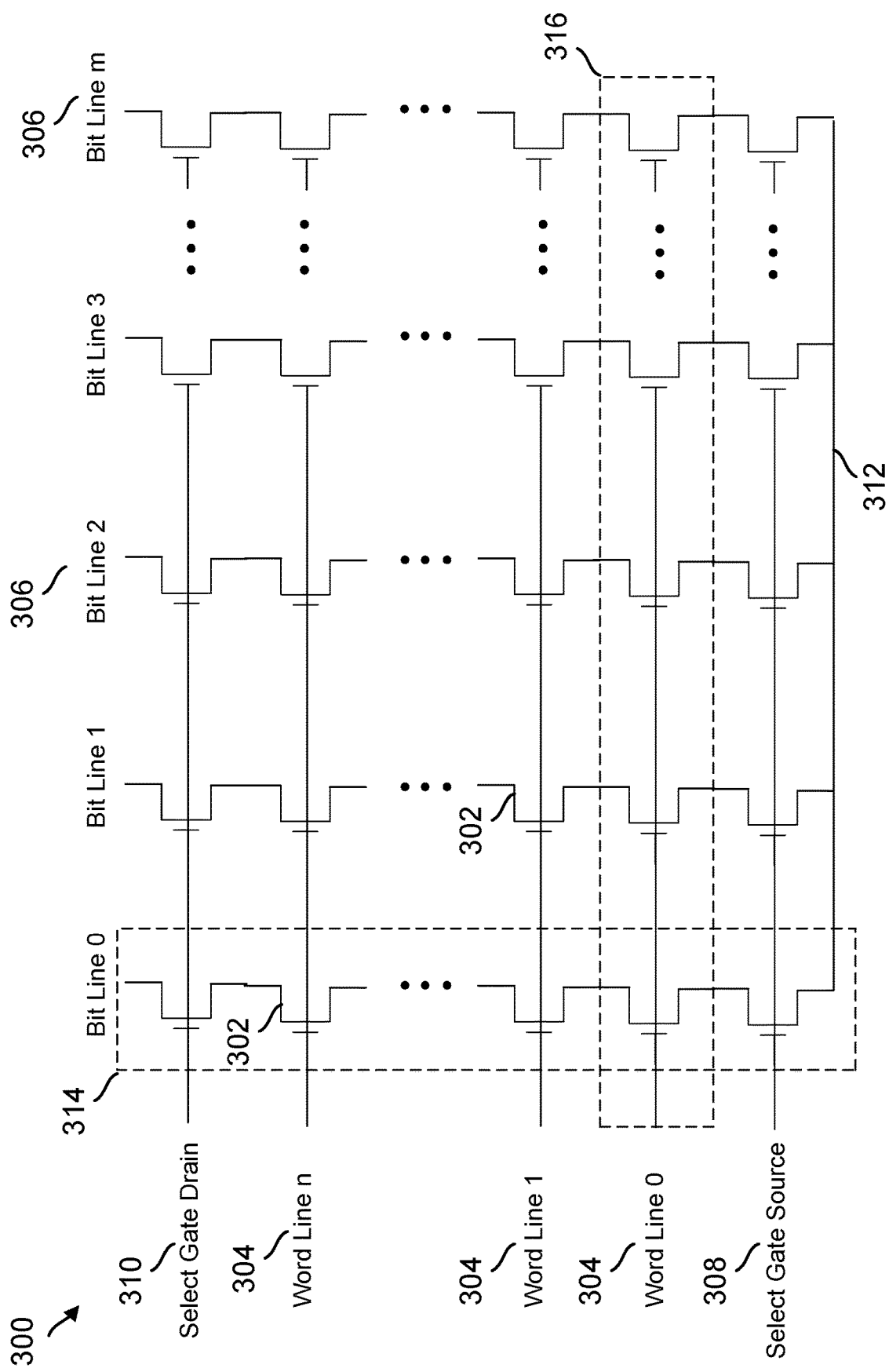
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
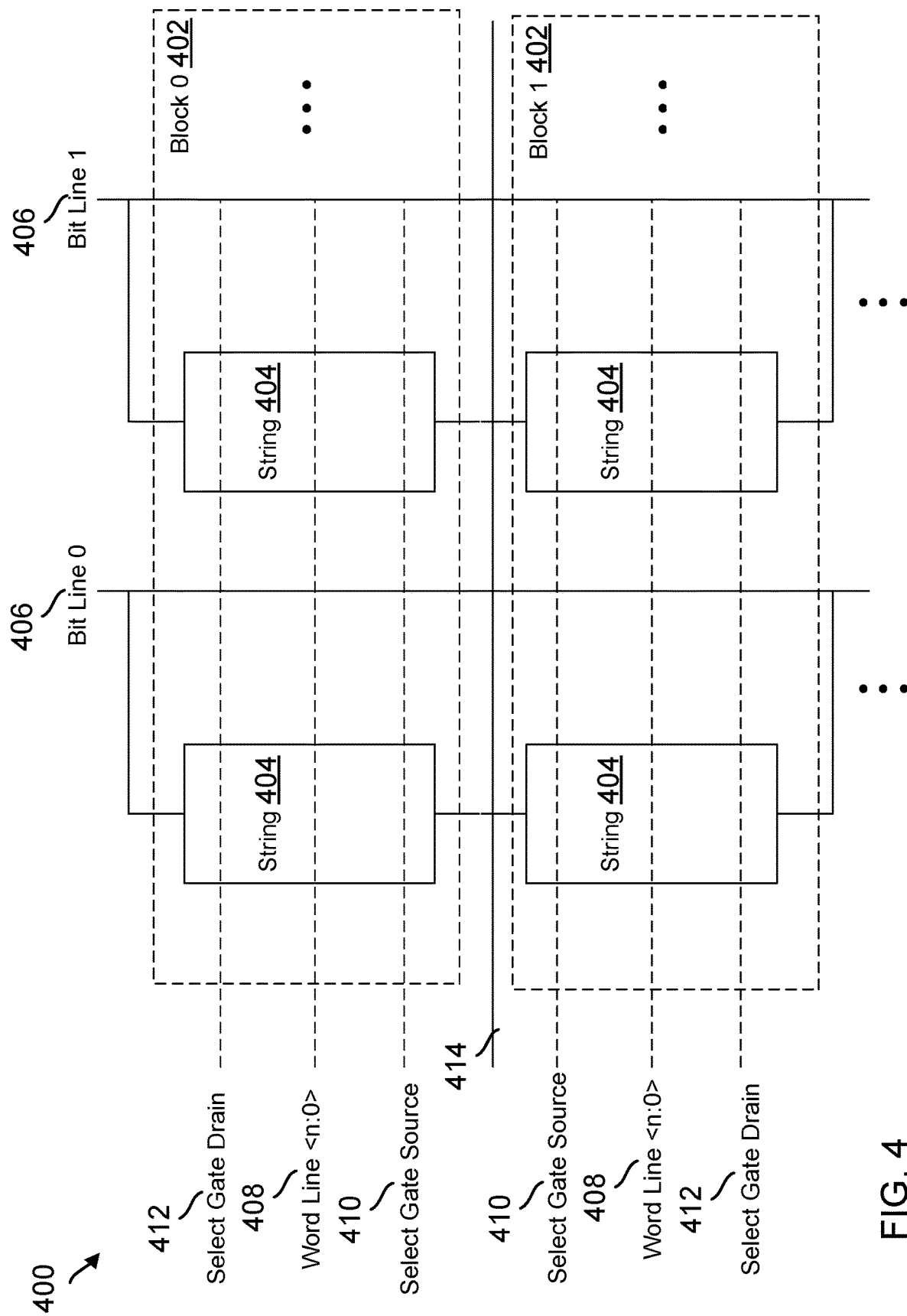
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response to the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
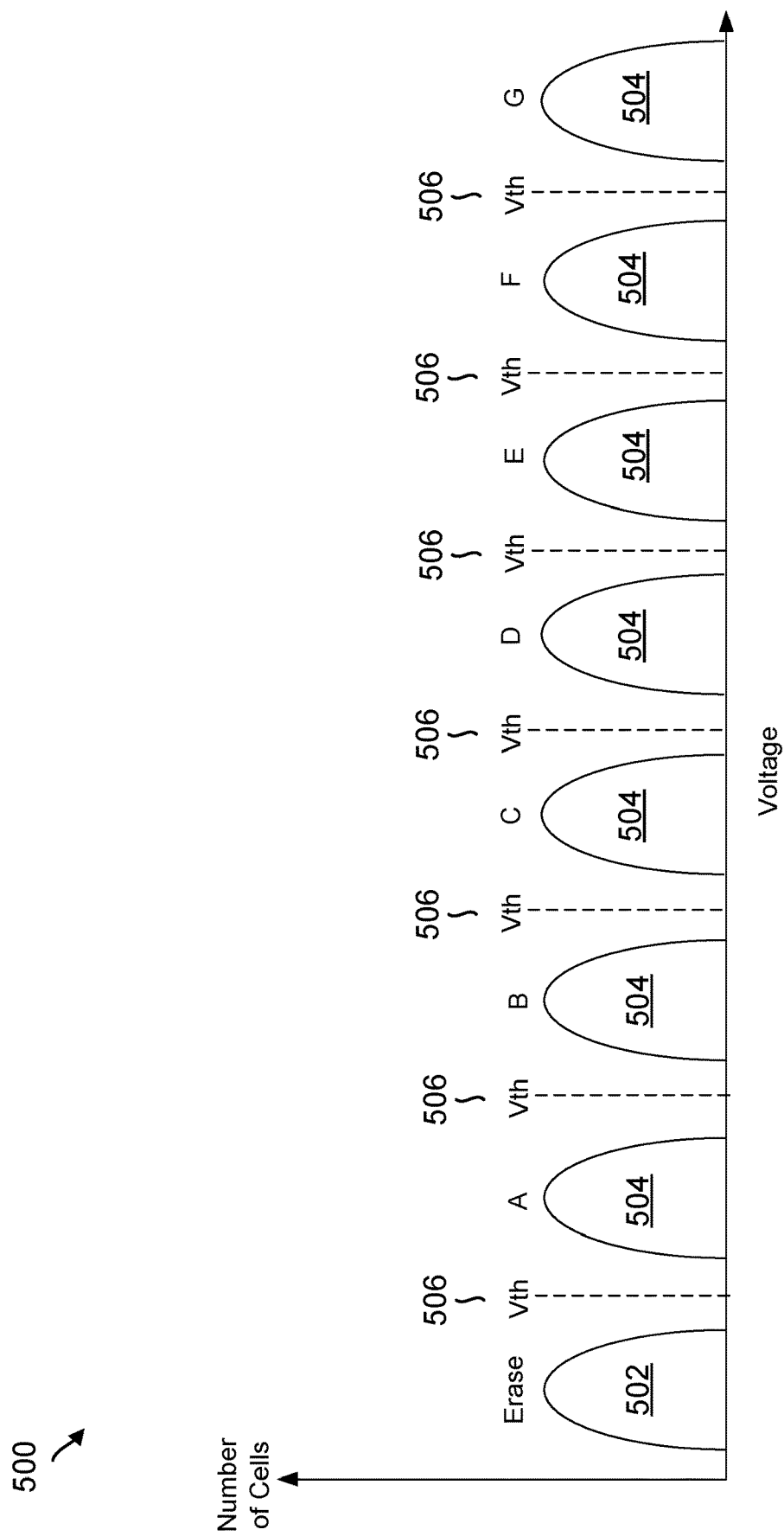
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

Figure 6:
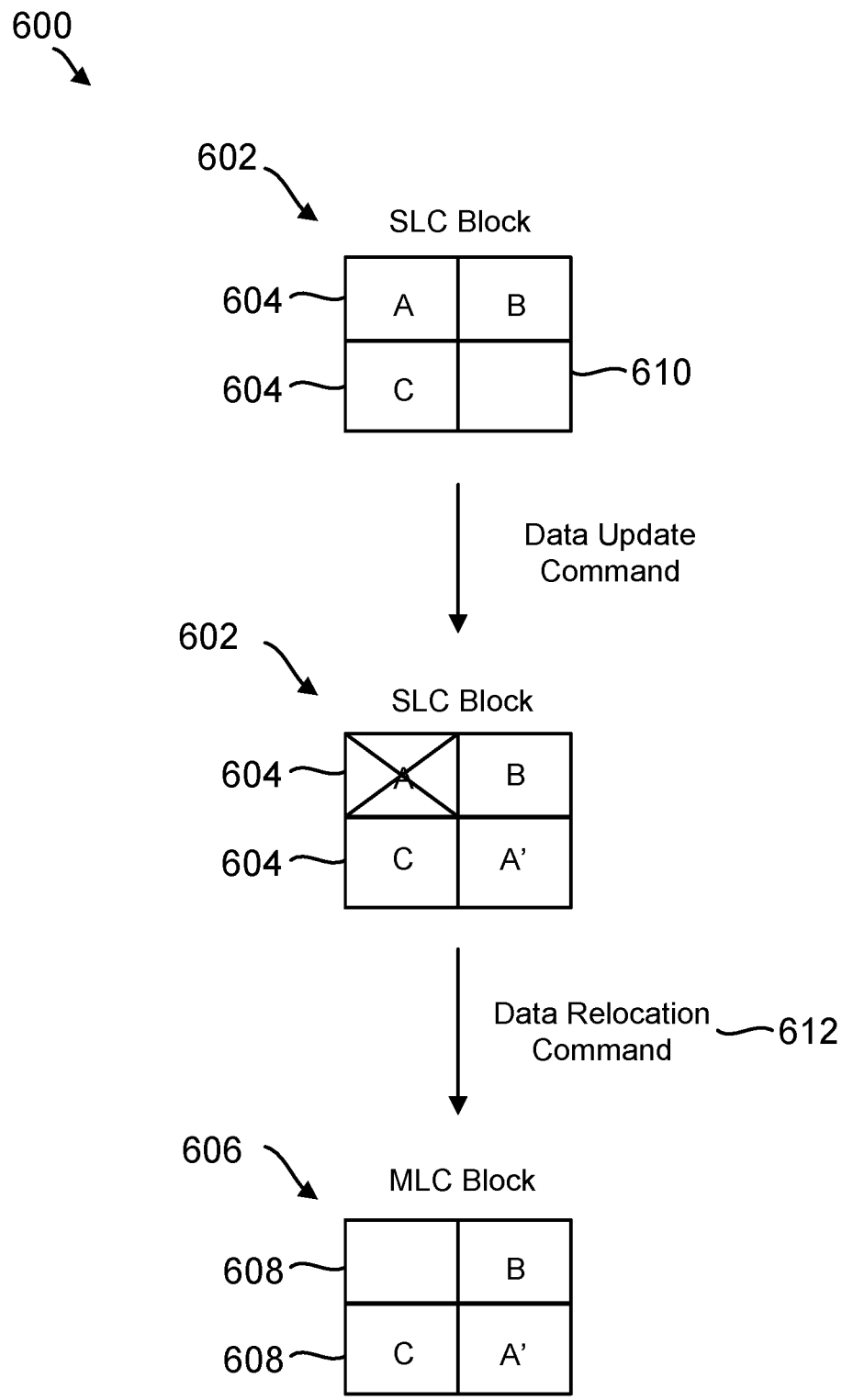
FIG. 6 is a conceptual diagram illustrating an example of a data relocation process that may be implemented in the storage device of FIG. 1.

FIG. 6 is a conceptual diagram 600 of an example of a data relocation process in which data stored in FMUs 604 of a block 602 of SLC cells are relocated to FMUs 608 of a block 606 of MLC cells. The data may correspond to the data 119 of FIG. 1, the blocks 602, 606 may correspond to the blocks 402 of FIG. 4, and the SLC/MLC cells may correspond to the cells 116, 302 of FIGS. 1 and 3. Each FMU 604, 608 includes data stored in multiple cells along a same row or word line (e.g. word line 304, 408) of the NVM. Thus, each FMU 604 may include data stored in a row of the cells 116 of one block, while each FMU 608 may include data stored in a row of the cells 116 of another block. For simplicity of illustration, the example of FIG. 6 illustrates the blocks 602, 606 each including only four FMUs. However, it should be recognized that each block may include any number of FMUs.

In the example of FIG. 6, data represented by identifiers A, B, and C are stored in different FMUs 604 of the block 602. Originally, the data A, B, and C are stored in three FMUs of the block 602 in response to write commands from the host device, leaving one of the FMUs free in this example. When the storage device receives new or updated data, this data is stored in the free FMU 610. For example, updated data A' may be received from the host device and written to the free FMU 610. Since data cannot be overwritten in flash memory, the invalid data A remains stored in the block 602. As a result of new data and invalid data, the block 602 may quickly become full.

To free space in the SLC block, the controller 123 may issue a data relocation command 612. In response to the data relocation command, original and updated data in the block 602 may be transferred to the block 606. The invalid data remain in the old block. For instance, in the example of FIG. 6, the original data B and C and the updated data A' are read from the FMUs 604 of the block 602 and written to one or more FMUs 608 of the block 606. The invalid data A remains in the block 602. When the block 602 is subsequently erased, the invalid data is discarded, and the block 602 may be reused to store new data.

Generally, when the controller 123 performs data relocation from one block (e.g., block 402, 602) to another block (e.g., block 402, 606) in response to data relocation command 612, the controller divides the block into multiple ranges of FMUs 604 for scanning. The controller may scan a single range of FMUs at a time, rather than scanning all of the FMUs in the entire block at once, in order to accommodate limited controller RAM and the relatively large size of scanned blocks (e.g., jumbo blocks spanning multiple blocks across multiple dies or planes). As an example, if a jumbo block is 48 MB in size with 12,288 FMUs, the controller may divide the block into 48 ranges of 1 MB each (e.g., 256 FMUs per range) to be scanned respectively for data relocation.

Then, for each FMU 604 in a current scan range, the controller 123 reads an FMU header for a logical address initially mapped to that FMU (e.g., logical address 208 such as a logical block address (LBA) originally associated with data 119 in FMU 604). Typically, the controller reads a logical address in a FMU header by sensing a page (e.g., page 316) including multiple FMUs using sense amplifiers 124 into latches 126, obtaining the logical addresses from the FMU headers of the FMUs stored in the latches 126, and storing the obtained logical addresses in the volatile memory 118 (e.g. controller RAM). The controller may sense FMU headers at a die page level (e.g., each sense may obtain data from a single page in a die). Moreover, each FMU header may include one or more namespaces for a logical address. For instance, a given range of logical addresses may be associated with a single namespace or multiple namespaces, and the logical address in a FMU header may indicate an associated namespace for that FMU. Thus, when the controller obtains logical addresses in FMU headers, the controller may simultaneously obtain the namespace(s) as well.

After the controller compiles a list of logical addresses read from the FMU headers in a current scan range, the controller translates each logical address to a physical address (e.g., physical address 210) in the L2P mapping table 120, 205, and the controller checks for translated physical addresses that match the physical addresses of the FMUs in which the associated logical addresses were initially stored. For the physical addresses that match, the controller identifies these FMUs as storing valid data, and the controller may relocate the valid data to a different block. For the physical addresses that do not match, the controller identifies these FMUs as storing invalid data, and the controller may keep this invalid data in the original block for subsequent erasure. For instance, in the example of FIG. 6, following a data update to block 602, the controller may read the headers of FMUs 604 for logical addresses associated with data A, B, C, and A', and compare the translated physical addresses in the L2P mapping table for data A, B, C, and A' with the physical addresses of the FMUs 604 in which the logical addresses were stored. Based on the translation, the controller may determine an address match for data B, C, and A', since the logical addresses for B, C, and A' are associated with current FMUs in the mapping table. In contrast, the controller may determine an address mismatch for data A, since the logical address for A is not associated with a current FMU in the mapping table (e.g., the logical address for A is now associated with A' in a different FMU). Accordingly, the controller may relocate the valid data B, C, and A', but not invalid data A, to block 606.

After the controller relocates the valid data to a different block, the controller may proceed to a next scan range and repeat the aforementioned process. The controller may similarly proceed through each scan range until the entire block has been scanned and valid data relocated, after which the controller may erase the invalid data in the block. However, this process may be quite time-consuming and power-intensive, as the controller may end up scanning tens of thousands of FMUs in a block (or more depending on block size) merely for logical addresses which occupy a very small fraction of the block size. For example, if the controller reads a 8 byte logical address in every 32 byte header of every 4 KB FMU in a 48 MB jumbo block, the controller may end up taking 15 ms and consuming 2,153 W to complete a relocation scan. It would be helpful to employ a much more efficient approach to data relocation scanning.

Figure 7:
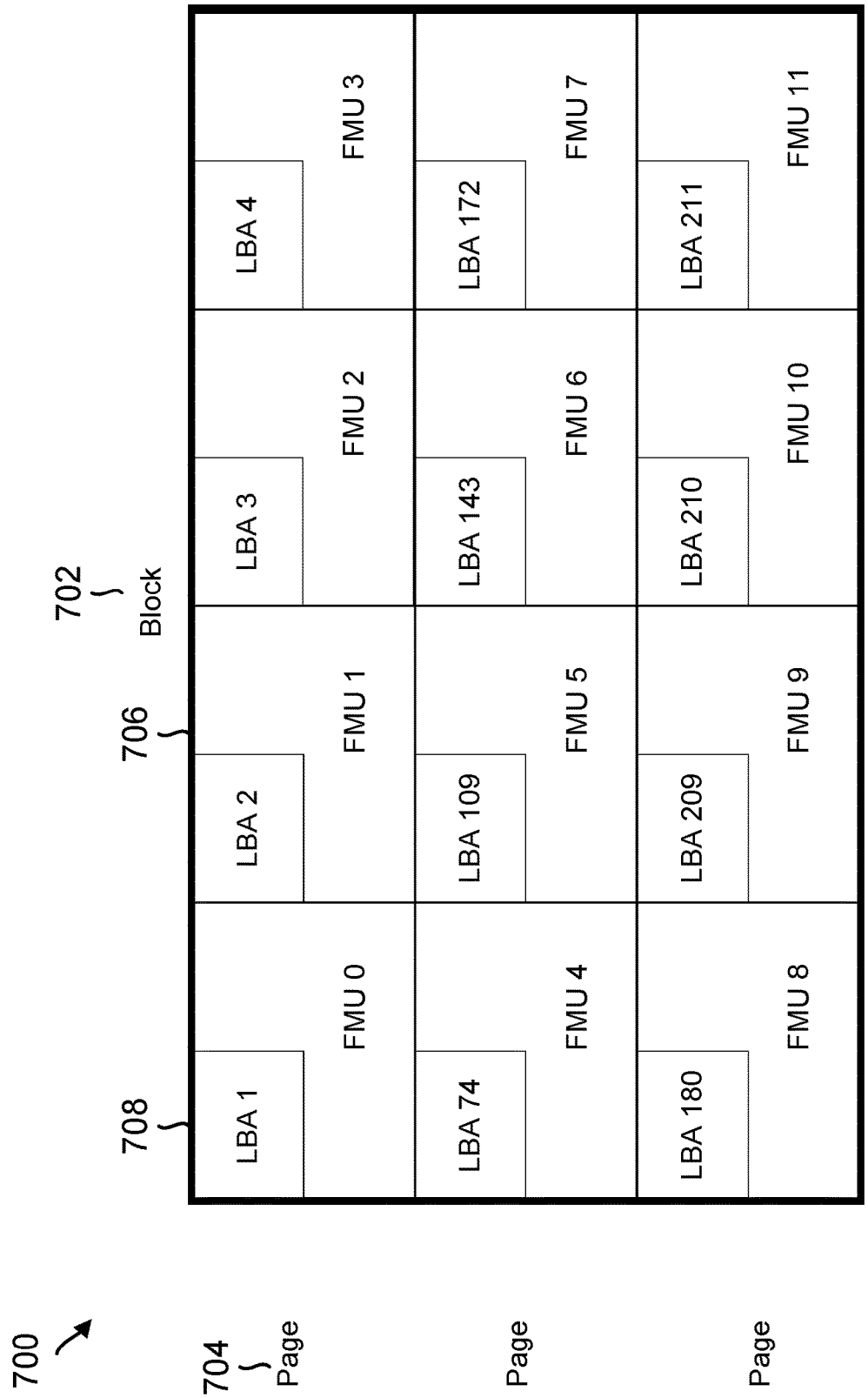
FIG. 7 is a conceptual diagram illustrating an example of a jumbo block including multiple pages of FMUs in the storage device of FIG. 1, where each FMU includes a header storing a logical address associated with that FMU.

FIG. 7 illustrates an example 700 of a block 702 including pages 704 of FMUs 706. Block 702 may correspond to block 402, 602, pages 704 may correspond to pages 316, and FMUs 706 may correspond to FMUs 604. While block 702 is illustrated in this example as only including 3 pages each containing 4 FMUs (a total of 12 FMUs), for clarity of illustration, it should be noted that the number of pages, number of FMUs per page, and total number of FMUs of block 702 may be different (e.g., much larger) in other examples. For example, block 702 may be a jumbo block including 12,288 FMUs over 3,072 pages each including 4 FMUs (e.g., where each FMU of a page is on a different die or plane).

Each FMU 706 may include a FMU header 708 which stores the logical address 208 (including namespace) originally mapped to that FMU. For instance, in the illustrated example, FMU 0 may store host data associated with LBA 1, FMU 1 may store host data associated with LBA 2, FMU 2 may store host data associated with LBA 3, and so forth. The controller 123 may also maintain L2P mapping table 120, 205 which indicates current mappings of logical addresses 208 (including namespaces) to physical addresses 210 of FMUs. For instance, in the illustrated example, if the controller receives a write command to write host data to LBAs 1-4, the controller may initially store the host data in FMUs 0-3 and update the L2P mapping table to indicate the mapping of those LBAs to the physical addresses of the FMUs accordingly (e.g., LBA 1 to FMU 0, LBA 2 to FMU 1, etc.). Originally, the physical address currently mapped to a logical address in the L2P mapping table 120, 205 is the same as the physical address of the FMU including the FMU header 708 where that logical address was initially stored (e.g., the FMU is a current FMU for that logical address), and therefore, the data stored in that FMU is originally valid. However, if the controller later receives a write command to overwrite or otherwise update data at a previously mapped logical address, the controller may store the updated data in a different FMU and update the L2P mapping table to indicate the updated mapping of the LBA to that FMU. As a result, the previous FMU storing the original (non-updated) data at that same logical address may be rendered invalid (e.g., the FMU is no longer a current FMU for that logical address).

During data relocation, the controller 123 may scan the block 702 for the logical addresses 208 in FMU headers 708. For instance, in the example of FIG. 7, the controller may obtain LBAs 1, 2, 3, 4, 74, 109, 143, 172, 180, 209, 210, and 211 in response to reading and decoding pages 704 including FMUs 0-11, respectively, although the logical addresses originally mapped to these FMUs may be different in other examples. After obtaining the LBAs, the controller may check each LBA against the L2P mapping table 120, 205 to determine whether an address match or mismatch exists between the physical address currently mapped to the LBA and the physical address of the FMU from which the LBA was read. For instance, in the illustrated example of FIG. 7 where the FMU header 708 of FMU 0 stores LBA 1, the controller may determine an address match exists if the L2P mapping table 120, 205 indicates LBA 1 is currently mapped to FMU 0, while the controller may determine an address mismatch exists if the L2P mapping table indicates that LBA 1 is currently mapped to another FMU other than FMU 0. If an address match exists for an FMU, the controller may determine that FMU contains valid data, and the controller may relocate the data in that FMU to another block accordingly. If an address mismatch exists for an FMU, the controller may determine that FMU contains invalid data, and the controller may keep the data in that FMU to be erased with other FMUs in the block accordingly. Thus, based on the FMU header information and the L2P mapping table, the controller may determine whether data in each FMU of block 702 is valid or invalid (e.g., overwritten).

Thus, when the controller 123 processes data relocation command 612 to relocate data 119 from one of the blocks 402, 602, 702 to another one of the blocks 402, 606 of the NVM 110, the controller 123 may sequentially read and decode pages 316, 704 of FMUs 604, 706 from the former block, obtain the logical addresses 208 from the FMU headers 708 associated with those FMUs 604, 706, verify the validity of data 119 stored at these logical addresses in the L2P mapping table 120, 205, and relocate the valid data stored at the verified logical addresses to the latter block. Each of the logical addresses associated with an FMU is also stored in a header for that FMU, such as illustrated in FIG. 7. Therefore, in order to obtain all of logical addresses 208 desired for data relocation from the former block, the controller may end up inefficiently reading every FMU 604, 706 in the block, including sensing significantly more data from each FMU or page of FMUs than desired, as well as possibly over-utilizing its pipelines in multiple parallel processes. As a result, a significant hit to storage device speed and power may occur, negatively impacting storage device performance.

Accordingly, to improve storage device performance, an optimized approach for storing and scanning data is provided which reorders the way that the logical addresses are stored, thereby leading to a reduced number of FMU reads or decodes during processing of a data relocation command. In one example, when the controller 123 receives host write commands including logical addresses 208 to write data 119 to FMUs of a jumbo block, the controller may accumulate or consolidate the logical addresses in controller RAM (e.g., as a single array) without significant overhead during execution of the host write commands. For instance, the controller may store the accumulated logical addresses in buffer 125 of volatile memory 118. After accumulating the logical addresses in the controller RAM, the controller may store (e.g., flush or dump) the logical addresses in a consolidated format depending on block size or FMU range size. For instance, the controller may store the consolidated logical addresses wholly in a single location (e.g., in a single area of the block in one or more contiguous FMUs or contiguous pages of FMUs), or divided between multiple such locations (e.g., in different areas of the block in one or more non-contiguous FMUs or non-contiguous pages of FMUs). The controller may store the consolidated logical addresses in the same jumbo block storing the host data, or in a different jumbo block, thus minimally impacting the capacity of the storage device.

Figure 8:
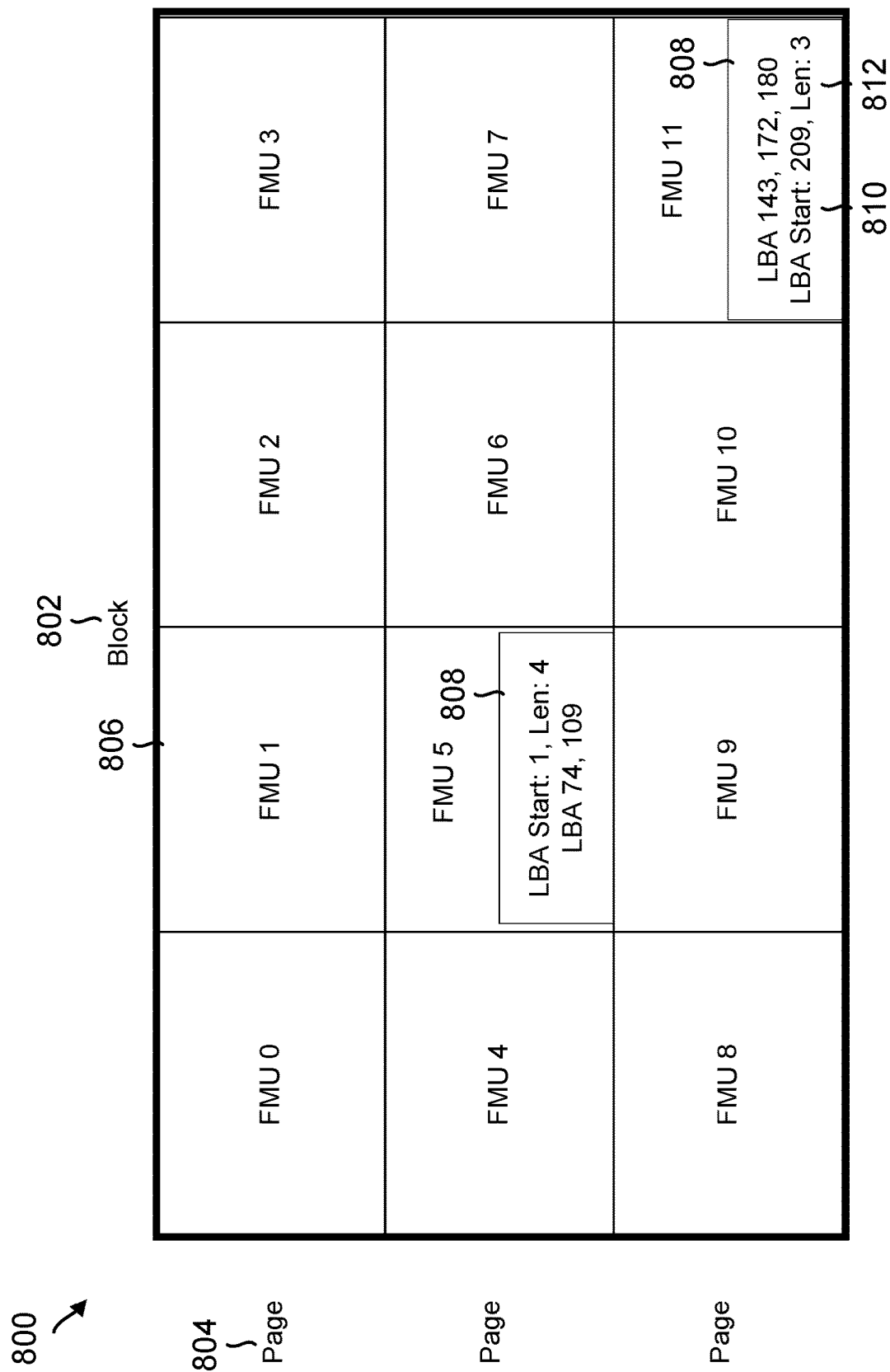
FIG. 8 is a conceptual diagram illustrating an example of a jumbo block including multiple pages of FMUs in the storage device of FIG. 1, where logical addresses associated with different FMUs may be consolidated for storage in a single FMU.

The controller may also compress sequential logical addresses in the consolidated logical addresses to reduce storage overhead. For instance, in sequential or mixed workloads where the controller receives host write commands with contiguous logical addresses, the controller may compress the contiguous logical addresses by storing a starting logical address and logical address range/length which indicate these logical addresses. As for non-contiguous logical addresses (or contiguous logical addresses without applying compression), the controller may individually store these logical addresses in consolidated format in the FMU. As an example, if the controller receives host write commands including LBAs 1, 2, 3, 4, 74, and 109, the controller may individually store all six of these LBAs individually in a single FMU (e.g., in a list such as LBAs 1, 2, 3, 4, 74, and 109), or the controller may compress the sequential LBAs 1, 2, 3, 4 (e.g., with an indication of starting LBA 1, length 4) and store the compressed and non-compressed LBAs individually in the single FMU (e.g., in a list such as starting LBA 1, length 4; LBA 74, and 109). An example of such storage is illustrated in FIG. 8, described more in detail below. As a result of the compression, the storage overhead of an FMU may be reduced, thereby allowing additional logical addresses to be stored in that FMU.

The controller may further split the FMUs of the block into zones or ranges (e.g., FMU ranges), and the controller may store consolidated logical addresses in the block according to the size of the different ranges (e.g., FMU range size). Here, an FMU range size refers to an amount of data the controller may scan during a single relocation process iteration when relocating data in multiple iterations. As an example, if a 48 MB jumbo block includes 12,288 FMUs, the controller may split the block into 48 FMU ranges each with 256 FMUs and each having an FMU range size of 1 MB. Thus, the controller may complete scanning the jumbo block in 48 different relocation process iterations, and prior to scanning an FMU range (e.g., 1 MB of FMUs) during each iteration (e.g., for 2 KB of 8-byte logical addresses), the controller may consolidate and store the logical addresses for the FMU range in one or more FMUs (or pages of FMUs). For instance, during each relocation process flow iteration, the controller may accumulate 256 8-byte logical addresses in buffer 125 and store the accumulated, 256 logical addresses in an FMU, repeating the process with different logical addresses over 48 iterations until the entire 48 MB jumbo block has been scanned and the consolidated logical addresses have all been stored in one or more FMUs.

Generally, the volatile memory 118 includes a relocation scan buffer in which the controller may store logical addresses read from the FMUs in the block during data relocation. This buffer may be the same buffer as that which stores accumulated logical addresses from host write commands (e.g., buffer 125), or a different buffer. Typically, the buffer size may be fixed to maintain RAM constraints in low-cost controllers with limited RAMs. Accordingly, to avoid overflowing the buffer during data relocation, the controller may determine an FMU range size for data relocation (e.g., a maximum number of FMUs in a zone) based on the buffer size, logical address size, block size, and FMU size. For instance, if the buffer size is 8 KB, the logical addresses are each 8 byte addresses, and the block including data to be relocated is a 48 MB jumbo block including 12,288 4 KB FMUs, the controller may determine the FMU range size to be 4 MB (dividing the block to be scanned in 12 parts, or 12 ranges/zones of 1024 FMUs each), since a 8 KB buffer may store at maximum 1024 8-byte logical addresses (8 KB of logical addresses) during a single relocation process flow iteration. Alternatively, the controller may determine the FMU range to be smaller than the maximum FMU range size (e.g., less than 4 MB in this example).

The controller may save RAM by dividing or splitting the block into multiple zones or ranges. As an example, if the controller is scanning 48 MB jumbo block with 12,288 FMUs, with each FMU being associated with an 8-byte logical addresses, the controller may need 96 KB of RAM to store the logical addresses for all 12,288 FMUs in a relocation process flow with only a single iteration. However, if the controller has RAM constraints (e.g., a limited buffer size less than 96 KB), a single FMU range or iteration may not be feasible, and so the controller may divide the block into multiple FMU ranges or iterations to accommodate the buffer size. For example, the controller may divide the block into 2 FMU ranges to accommodate a buffer size of 48 KB, 4 FMU ranges to accommodate a buffer size of 24 KB, 12 FMU ranges to accommodate a buffer size of 8 KB, 24 FMU ranges to accommodate a buffer size of 4 KB, or 48 FMU ranges to accommodate a buffer size of 2 KB. In some examples, the buffer size may be fixed, while in other examples, the controller may configure or select its buffer size (subject to RAM constraints). In either case, the controller may accumulate in the buffer and write from the buffer respective sets of consolidated logical addresses in different zones or FMU ranges over multiple iterations. For example, the controller may store one sequence of logical addresses in one FMU during one iteration, another sequence of logical addresses in another FMU during another iteration, and so forth.

As a result of the logical address consolidation, when the controller performs data relocation in response to data relocation command 612, the controller 123 may fetch the consolidated logical addresses from the FMU(s) or page(s) in one or more senses depending on the block size or range size (e.g., number of consolidated locations). As an example, in a 48 MB jumbo block, if the FMU range size or amount of data the controller scans during a single relocation process iteration is 1 MB (resulting in 48 FMU ranges to scan respectively in 48 relocation process iterations), then during each iteration, the controller may consolidate the logical addresses for 1 MB worth of FMUs in a single page of FMUs, and the controller may fetch the logical addresses from that page in a single sense from the block. The controller may thus consolidate the logical addresses associated with 48 MB worth of FMUs in a same FMU, in a reduced number of different FMUs, within a same page of FMUs, within a reduced number of different pages of FMUs, or within a combination of the aforementioned same and different FMUs or pages. For example, in a 48 MB jumbo block with 12,288 4 KB FMUs, the controller may consolidate the logical addresses associated with all 12,288 FMUs in 24 FMUs (contiguous or non-contiguous FMUs), or six pages of four 4 KB FMUs (e.g., contiguous or non-contiguous pages), rather than in 12,288 FMUs or 3,072 pages of FMUs. The controller may also compress the logical addresses within a single FMU if all 12,288 logical addresses are sequential, or otherwise in a smaller number of FMUs if the logical addresses are in non-contiguous, sequential ranges. After the controller obtains the consolidated logical addresses in an FMU range during each relocation process flow iteration, the controller may store the logical addresses in the buffer 125 for subsequent verification against the L2P mapping table 120, 205. The controller may similarly repeat the aforementioned process of reading consolidated logical addresses from one or more FMU(s) or page(s) and verifying the logical addresses against the L2P mapping table in other iterations for each FMU range of the block as previously described.

Consequently, the controller may perform a reduced number of senses than that previously described with respect to FIG. 7 in order to obtain all the logical addresses of the FMUs in the block. For instance, the controller may perform a single sense of a single page of FMUs including consolidated logical addresses in each FMU range. As a result, the controller may save relocation time and processing power, thereby improving storage device performance. As an example, rather than spending 15 ms and 2153 W of power for a relocation scan of a 48 MB jumbo block storing logical addresses in every FMU such as illustrated in FIG. 7, in this case due to the reduced number of senses overall, the controller may more efficiently perform the process in 0.029 ms and using 4.3 W of power. The time and power consumption may change depending on the size of the jumbo block and other factors. However, in any case, a 99.8% improvement in latency and power consumption may be achieved. Various examples of latency and power improvements for various sized, jumbo blocks (JBs) are illustrated below in Tables 1, 2, 3, and 4, respectively. Moreover, as the controller may store consolidated logical addresses in the same block as the FMUs storing the host data associated with these logical addresses, or alternatively in a different block, the capacity of the storage device may also be minimally impacted.

TABLE 1

SLC Latency Comparison

| Nand Node | Capacity | Perf. SLC (MB/s) | SLC Jumbo Block size (MB) | SLC Original Estimated time for scan (ms) | SLC Estimated data to be read with updated scheme (MB) | SLC Updated Estimated time for scan (ms) | Impr. (%) |
|---|---|---|---|---|---|---|---|
| BiCS4-X4 | 512 | 3200 | 48 | 15 | 0.09 | 0.029 | 99.8% |
| | 1024 | 3400 | 96 | 28 | 0.19 | 0.055 | 99.8% |

TABLE 1-continued

SLC Latency Comparison

| Nand Node | Capacity | Perf. SLC (MB/s) | SLC Jumbo Block size (MB) | SLC Original Estimated time for scan (ms) | SLC Estimated data to be read with updated scheme (MB) | SLC Updated Estimated time for scan (ms) | Impr. (%) |
|---|---|---|---|---|---|---|---|
| | 2048 | 3400 | 192 | 56 | 0.38 | 0.110 | 99.8% |
| | 4096 | 3400 | 384 | 113 | 0.75 | 0.221 | 99.8% |

TABLE 2

QLC Latency Comparison

| Nand Node | Capacity | Perf. QLC (MB/s) | QLC Jumbo Block size (MB) | QLC Original Estimated time for scan (ms) | QLC Estimated data to be read with updated scheme (MB) | QLC Updated Estimated time for scan (ms) | Impr. (%) |
|---|---|---|---|---|---|---|---|
| BiCS4-X4 | 512 | 1013 | 192 | 190 | 0.38 | 0.370 | 99.8% |
| | 1024 | 1369 | 384 | 280 | 0.75 | 0.548 | 99.8% |
| | 2048 | 3100 | 768 | 248 | 1.50 | 0.484 | 99.8% |
| | 4096 | 3100 | 1536 | 495 | 3.00 | 0.968 | 99.8% |

TABLE 3

SLC Power Comparison

| Nand Node | Capacity | JB Size | SLC Original Power consumed for a source block scan (Watts) | Updated Power consumed for a source block scan (Watts) | % Improvement |
|---|---|---|---|---|---|
| BiCS4-X4 | 512 | 48 | 2153 | 4.3 | 99.8% |
| | 1024 | 96 | 4306.944 | 8.6 | 99.8% |
| | 2048 | 192 | 8613.888 | 17.2 | 99.8% |
| | 4096 | 384 | 17227.776 | 34.4 | 99.8% |

TABLE 4

QLC Power Comparison

| Nand Node | Capacity | JB Size | QLC Original Power consumed for a source block scan (Watts) | Updated Power consumed for a source block scan (Watts) | % Improvement |
|---|---|---|---|---|---|
| BiCS4-X4 | 512 | 192 | 2211 | 4.3 | 97.8% |
| | 1024 | 384 | 4422 | 8.6 | 97.8% |
| | 2048 | 768 | 8844 | 17.2 | 97.8% |
| | 4096 | 1536 | 17688 | 34.4 | 97.8% |

FIG. 8 illustrates an example 800 of a block 802 including pages 804 of FMUs 806 resulting in the aforementioned performance improvement. Block 802 may correspond to block 402, 602, 702, pages 804 may correspond to pages 316, 704, and FMUs 806 may correspond to FMUs 604, 706. Similar to the example of FIG. 7, while block 802 is illustrated in this example as only including 3 pages each containing 4 FMUs (a total of 12 FMUs), for clarity of illustration, it should be noted that the number of pages, number of FMUs per page, and total number of FMUs of block 802 may be much larger in other examples. For example, block 802 may be a jumbo block including 12,288 FMUs over 3,072 pages each including 4 FMUs (e.g., where each FMU of a page is on a different die or plane).

During runtime, when the controller 123 receives host write commands including logical addresses, the controller may store the logical addresses in a data structure in the volatile memory 118 (e.g., controller RAM). The data structure may be, for example, buffer 125 (e.g., a relocation scan buffer), or some other buffer or table in the RAM. As each logical address spans a smaller number of bytes (e.g., 8 bytes) than that of an FMU (e.g., 4 KB), the controller may not directly write each logical address to an FMU at the time received. Instead, the controller may accumulate a plurality of these logical addresses over time in the controller RAM until a threshold number of logical addresses is reached (e.g., 4 KB of logical addresses corresponding to an FMU size is received), the data structure is full (e.g., 8 KB or other configured buffer size is reached), a configured number of FMUs is read, a certain FMU in the block is reached during host data programming, or some other trigger is met, in response to which trigger the controller may write accumulated or consolidated logical addresses 808 to one or more of the FMUs 806.

For instance, referring to the example of FIG. 8, the controller 123 may receive the following logical addresses in host write commands: LBAs 1, 2, 3, 4, 74, 109, 143, 172, 180, 209, 210, 211, process the host write commands to obtain the LBAs, and store (accumulate) these logical addresses in the buffer 125 in the volatile memory 118. Furthermore, the controller may write host data associated with these LBAs to available FMUs in response to the host write commands. For instance, the controller may write data associated with LBA 1 in FMU 0, data associated with LBA 2 in FMU 2, data associated with LBA 3 in FMU 2, and so forth (similar to the example of FIG. 7). After accumulating a threshold number of logical addresses in the volatile memory, the controller may store (e.g., dump) the consolidated logical addresses 808 in one or more FMUs 806 of the block 802. For example, if the threshold number of logical addresses is 6 (e.g., at which point the size of buffer 125 becomes full) the controller may trigger storage of the logical addresses in a next available FMU at the time the threshold number is met. Thus, as illustrated in the example of FIG. 8, the controller may accumulate LBAs 1, 2, 3, 4, 74, and 109 in volatile memory while writing data associated with these LBAs to FMUs 0-5 respectively, store the consolidation of these LBAs accordingly in the next available FMU 5, next accumulate LBAs 143, 172, 180, 209, 210, 211 in volatile memory while writing data associated with these LBAs to FMUs 6-11 respectively, and store the consolidation of these LBAs accordingly in the next available FMU 11. Alternatively, rather than storing the LBAs in a next available FMU, the controller may store LBAs in one or more pre-defined or dynamically determined locations of block 802 (or a different block). In any event, the controller may thus consolidate the logical addresses individually associated with multiple FMUs in a single FMU (or smaller number of FMUs in total), rather than storing individual logical addresses respectively in individual FMU headers such as in the example of FIG. 7. As a result, when the controller fetches the consolidated logical addresses 808 from the block in response to data relocation command 612, the controller may efficiently perform a smaller number of senses than in the previous example. For instance, rather than reading all of FMUs 0-11 for the logical addresses in block 702 as in the example of FIG. 7, here the controller may more quickly read only FMUs 5 and 11 for all the logical addresses in block 802, thereby reducing relocation latency and improving performance. Additionally, in contrast to the example of FIG. 7, here the controller may store the consolidated logical addresses 808 directly in a data portion of an FMU, rather than in a metadata portion of the FMU (e.g., the FMU header).

Moreover, to obtain further efficiency in the scanning or sensing for data relocation, the controller 123 may compress certain metadata (e.g., sequential logical addresses) to be stored in the one or more FMUs. For instance, unlike the example of FIG. 7 where each logical address is stored in an individual FMU header and thus may not be compressible, in the example of FIG. 8, multiple logical addresses associated with different FMUs may be consolidated in a single FMU. While the benefits of compression may not be immediately apparent in the illustrated example of FIG. 8 with only 12 FMUs, such benefits may be significant in the case of a jumbo block with a large number of logical addresses (e.g., for each of 12,288 FMUs). In such jumbo blocks, the consolidation of logical addresses in one or more FMUs without compression (e.g., storing each consolidated LBA individually in a list) may inefficiently occupy a significant amount of FMU space.

Accordingly, to reduce the amount of metadata stored in a FMU, the controller 123 may compress consolidated logical addresses which are received in a sequential workload (e.g., contiguous logical addresses). For instance, in sequential or mixed workloads, the controller may store in an FMU a starting logical address 810 and a logical address range 812 (or length) for multiple contiguous logical addresses (such as LBAs 1-4 and LBAs 209-211 in the example of FIG. 8), while in random or mixed workloads, the controller may individually store non-contiguous logical addresses. For instance, referring to the example of FIG. 8 where the controller consolidates LBAs 1, 2, 3, 4, 74, 109, in FMU 5 as one zone and LBAs 143, 172, 180, 209, 210, 211 in FMU 11 as another zone, the controller may store the starting logical addresses 810 and logical address ranges 812 of the sequential LBAs 1-4 and 209-211 in FMUs 5 and 11 respectively while storing the non-contiguous LBAs individually as previously described. For example, the controller may store LBA 1, length/range 4 followed by LBA 74 and 109 in FMU 5, and the controller may store LBAs 143, 172, and 180 followed by LBA 209, length/range 3 in FMU 11, thereby saving FMU space in FMUs 5 and 11.

Thus, the controller 123 may store logical addresses associated with each FMU of a zone or block in a single FMU, or otherwise a reduced number of FMUs compared to FIG. 7, to improve data relocation efficiency. The controller may store the consolidated logical addresses in numerous ways, various examples of which are described below and may be applied by the controller individually or in combination. After the controller stores the logical addresses or the host data in the FMU(s), the controller may update the L2P mapping table 120, 205 to indicate the mapping of logical addresses to respective FMUs. For instance, after each FMU is written with host data or after the consolidated logical addresses associated with the host data are stored in a FMU, the controller may create entries in L2P mapping table 120, 205 respectively mapping each logical address to the FMU in which associated data is stored. In some cases, the controller may also create one or more entries in L2P mapping table 120, 205 mapping the consolidated logical addresses to the FMU(s) in which the consolidated logical addresses are stored.

In one example of how the controller 123 may store consolidated logical addresses 808, the controller may store consolidated logical addresses in a portion of an FMU, such as in portions of FMUs 5 and 11 as in the example of FIG. 8. For example, if each FMU is 4 KB in size and the FMU range size includes 2 KB of logical addresses, the controller may store consolidated logical addresses (including compression) in a 2 KB metadata portion of a FMU while storing host data in a 2 KB data portion of that FMU. In such case, the storage capacity of the block may be reduced by the metadata portion, and therefore the controller may provide a different user data capacity to the host device than initially configured (e.g. 2 KB per FMU for data instead of 4 KB).

In another example of how the controller 123 may store consolidated logical addresses 808, the controller may store the consolidated logical addresses in a dedicated FMU (or FMUs) of the block 802, rather than in a portion of an FMU of the block. Here, the block may be the same block which stores the data associated with the consolidated logical addresses. For instance, after accumulating logical addresses associated with FMUs 806 in block 802, the controller may consolidate the logical addresses by storing these addresses in one or more dedicated FMUs of block 802 for storing the metadata. As an example, for instance in a variation of FIG. 8, the controller may dedicate FMU 5 and 11 each for storing only consolidated logical addresses 808 (e.g., only including metadata portions), rather than for storing both consolidated logical addresses and host data as in the previous example. In such case, since the storage capacity of the block may not be affected by the consolidated metadata (since the logical addresses are stored in other FMUs of the block than allocated for data writes), the controller may continue to provide the same data capacity to the host device as initially configured (e.g., 4 KB per FMU for data).

In a further example of how the controller 123 may store consolidated logical addresses 808, the controller may store the consolidated logical addresses in one or more FMUs of a dedicated block for the metadata. Here, the block may be a different block than that which stores the data associated with the consolidated logical addresses. For instance, after accumulating logical addresses associated with FMUs 806 in block 802, the controller may consolidate the logical addresses by storing these addresses in one or more FMUs of a block different than block 802. In such case, since the storage capacity of the block may not be affected by the consolidated metadata (since the logical addresses are stored in a different block), the controller may continue to provide the same data capacity to the host device as initially configured.

In various examples of how the controller 123 may store consolidated logical addresses 808, the controller may store consolidated logical addresses from one or more zones of a block which contains the data associated with the logical addresses. Similar to previous examples, the FMUs storing consolidated logical addresses from these zones may be partial FMUs or complete FMUs. Additionally, in these examples, these zones/FMU ranges, or the FMUs storing consolidated logical addresses from these zones, may be pre-defined or determined based on block size, range size or other factors. For instance, in the example of FIG. 8, the controller may determine to store consolidated logical address 808 from FMUs 0-5 (in one zone) in FMU 5, and to store consolidated logical addresses 808 from FMUs 6-11 (in one zone) in FMU 11, based on a size of block 802, a size of each zone, a size of buffer 125, or other factors.

As an example, the controller 123 may accumulate in buffer 125 a number of logical addresses for each range of FMUs (e.g., based on a FMU size, logical address size, a buffer size, a block size, or a FMU range size) and the controller may store the accumulated logical addresses for each range in at least a portion of the last FMU associated with the corresponding FMU range. As an example, in a 48 MB jumbo block including 12,288 4 KB FMUs each associated with an 8-byte logical address (where each FMU may store 512 logical addresses), the controller may accumulate 96 KB of logical addresses in RAM if the controller is consolidating all logical addresses of the block in one zone or FMU range, 48 KB of logical addresses in RAM if the controller is splitting consolidated logical addresses between two zones or FMU ranges, 24 KB of logical addresses in RAM if the controller is splitting consolidated logical addresses between four zones or FMU ranges, etc., depending on RAM constraints/buffer size (e.g., 1 zone for a 96 KB buffer size, 2 zones for a 48 KB buffer size, 4 zones for a 24 KB buffer size, etc.). As a result, the consolidated logical addresses corresponding to different FMU ranges may be spaced evenly within the block or jumbo block. Thus, in the example of a jumbo block size corresponding to 12,288 FMUs (48 MB) and range size corresponding to 6,144 FMUs (two zones), the controller may determine to evenly store two ranges of consolidated logical addresses (e.g., FMUs 0-6143 and FMUs 6144-12287) in FMUs 6143 and 12287 respectively, in response to filling a 48 KB RAM buffer with each zone's worth of logical addresses. Similarly, referring to the example of FIG. 8 where a block size of 12 FMUs and a range size corresponding to two zones is illustrated, the controller may similarly determine to evenly store two ranges of consolidated logical addresses (e.g., FMUs 0-5 and FMUs 6-11) in FMUs 5 and 11 respectively based on the block size, range size, buffer size, or other factors noted above.

Alternatively, in a different example, rather than splitting logical addresses evenly between different zones and separated from each other by numerous FMUs such as illustrated in FIG. 8, the controller 123 may designate or dedicate multiple, contiguous FMUs or contiguous pages of FMUs for storing the logical addresses corresponding to different FMU ranges. The number of FMUs (or pages of FMUs) may similarly be based on the FMU size, page size, logical address size, or block size. For instance, in a 48 MB jumbo block where one page includes 4 FMUs, each FMU stores 4 KB of data, and one complete FMU of the block 802 stores 512 8-byte logical addresses (e.g., one logical address for each FMU), the controller may designate 24 contiguous FMUs or 6 contiguous pages in the block to store all the consolidated logical addresses for the jumbo block. In such case, the first FMU may store the logical addresses corresponding to one FMU range, the second FMU may store the logical addresses corresponding to another FMU range, and so forth. This example may be shown in a variation of the example of FIG. 8 where a block size of 12 FMUs and a range size corresponding to two zones is illustrated, in which case based on the factors noted above, the controller may determine instead to store the two ranges of consolidated logical addresses (e.g., FMUs 0-5 and FMUs 6-11) in contiguous FMUs 10 and 11 respectively (rather than in FMUs 5 and 11 as illustrated).

Additionally, the controller may configure or select a size of its buffer in RAM for storing any zone's worth of logical addresses in an FMU range. For instance, in the example of FIG. 8, the controller may configure a 48 byte buffer to store 6 8-byte logical addresses corresponding to FMUs 0-5 in one zone, and later 6 additional 8-byte logical addresses corresponding to FMUs 6-11 in another zone. The buffer size may be reconfigurable by the controller within controller RAM limits as block sizes increase. For instance, for a 48 MB jumbo block as previously described, the controller may configure its buffer size to be 96 KB for consolidating logical addresses in one zone, 48 MB for consolidating logical addresses in two zones, or 24 MBs for consolidating logical addresses in four zones, etc. Similarly, for a 96 MB jumbo block with similar characteristics (e.g., logical address size and FMU size), the controller may increase its buffer size accordingly depending on the number of zones desired and available controller RAM. The controller may thus adjust the number of zones, and the number of logical addresses being consolidated in a zone, notwithstanding the location of the consolidated addresses in each zone (e.g., regardless of whether the controller splits zones evenly between separated FMUs or between contiguous FMUs).

As a result, when the controller 123 subsequently executes data relocation command 612, the controller may read only the page(s) 804 of FMUs 806 which store the consolidated logical addresses 808, rather than all the pages of FMUs 806 in the block 802 as previously described, in order to perform the data validity verification against the L2P mapping table 120, 205. In this way, relocation latency may be improved. For example, as noted above in Table 1, the controller may avoid spending 15 ms reading an entire 48 MB jumbo block for the metadata during data relocation, and may instead spend significantly less time (e.g., 0.029 ms) reading a small number of pages to achieve a 99.8% improvement in performance. The smaller number of pages may be visualized in a comparison between the illustrated examples of FIGS. 7 and 8. For instance, in the example of FIG. 8 the controller only reads two pages (e.g., the pages containing FMU 5 and 11) to obtain all twelve logical addresses associated with FMUs 0-11, in contrast to reading three pages (e.g., the pages containing FMUs 0-11) for all twelve logical addresses in the example of FIG. 7. Moreover, performance may be improved further if the logical addresses are stored in contiguous FMUs (e.g., in FMUs 10 and 11 in a variation of FIG. 8) rather than in evenly spaced apart FMUs (e.g., FMUs 5 and 11 in the example of FIG. 8), since in that case the controller may only read one page including the contiguous FMUs to obtain all the twelve logical addresses. In either case, the reduction in number of pages sensed during data relocation may lead to lower latency, less power consumed, and thus greater storage device performance.

Figure 9:
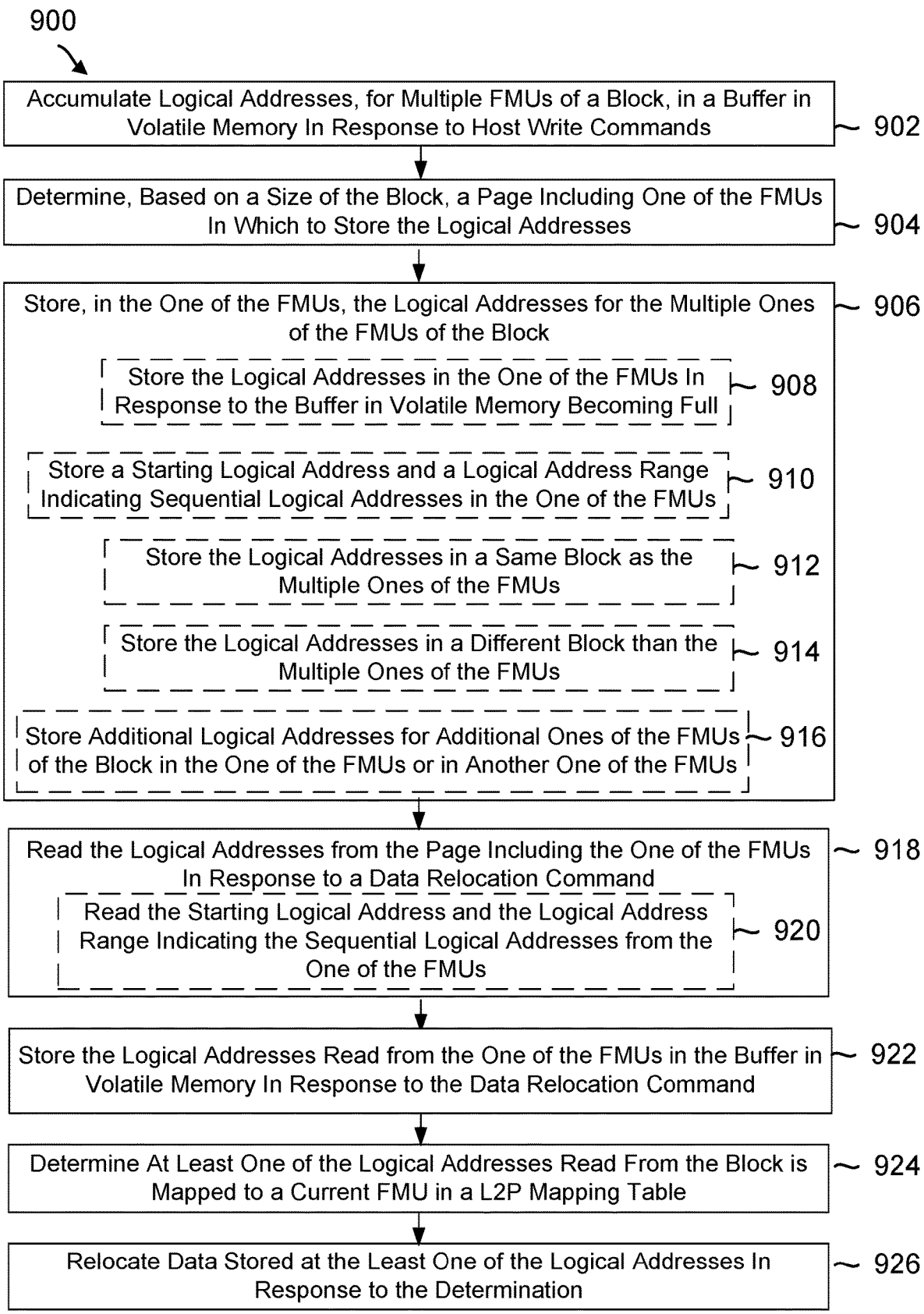
FIG. 9 is a flow chart illustrating an example of a method for relocating data associated with consolidated logical addresses in an FMU, as performed by the storage device of FIG. 1.

FIG. 9 illustrates an example flow chart 900 of a method for relocating data associated with consolidated logical addresses in an FMU. For example, the method can be carried out in a storage device 102 such as the one illustrated in FIG. 1. Each of the steps in the flow chart can be controlled using the controller as described below (e.g. controller 123), by a component or module of the controller, or by some other suitable means.

In the following blocks or steps of example flow chart 900, references to a storage device (e.g., storage device 102) including a memory and a controller are provided. The memory (e.g., NVM 110) comprises a block (e.g., block 402, 602, 606, 702, 802) including a plurality of pages (e.g., 316, 704, 804) and a plurality of FMUs (e.g., FMUs 604, 608, 706, 806), where each of the pages include one or more of the FMUs. For instance, referring to the example of FIG. 8, the block 802 may include a first page (e.g., page 804 including FMUs 4-7), a second page (e.g., page 804 including FMUs 8-11), first FMUs (e.g., FMUs 0-5), and second FMUs (e.g., FMUs 6-11), where the first page includes the first FMUs (e.g., FMUs 4 and 5) and the second page includes the second FMUs (e.g., FMUs 8-11). In one example, the block 802 may be a jumbo block. In various examples, the storage device 102 may also include a volatile memory (e.g., volatile memory 118) including a buffer (e.g., buffer 125).

As represented by block 902, the controller may accumulate logical addresses, for multiple ones of the FMUs of the block, in the buffer of the volatile memory in response to host write commands. In one example, a total size of the multiple ones of the FMUs associated with the logical addresses is based on a size of the buffer. For instance, referring to the aforementioned Figures, the controller 123 may accumulate the logical addresses 208 received in host write commands (e.g., consolidated logical addresses 808), which logical addresses are respectively mapped to FMUs 806 of block 802, and the controller may store the accumulated logical addresses in buffer 125 of volatile memory 118. The controller may determine a total size of FMUs 806 associated with logical addresses 208 (e.g., an FMU range size or number of FMUs in a zone) based on a size of buffer 125. For instance, if the controller includes a 48 KB buffer in volatile memory for a 48 MB jumbo block including 12,288 FMUs, then to accommodate the buffer size, the controller may determine to split the jumbo block into two zones (e.g., each having a total size of FMUs or FMU range size of 6,144 FMUs or 24 MB). Similarly, in the example of FIG. 8, the controller may determine to split block 802 in two zones such that the FMU range size is six FMUs (e.g., FMUs 0-5 associated with LBAs 1, 2, 3, 4, 74, and 109 respectively in one zone, and FMUs 6-11 associated with LBAs 143, 172, 180, 209, 210, 211 in another zone) in order to accommodate a given buffer size in controller RAM.

As represented by block 904, the controller may determine, based on a size of the block, a page including one of the FMUs in which to store the logical addresses. For instance, referring to the aforementioned Figures, the controller 123 may determine based on a size of block 802, to store consolidated logical addresses 808 in one of the pages 804 including one of the FMUs 806 for a given zone. For instance, if the controller is storing consolidated logical addresses 808 in a 48 MB jumbo block including 12,288 FMUs and 3,072 pages of these FMUs (e.g., 4 FMUs per page), the controller may determine to store all of the consolidated logical addresses in six pages (e.g., 24 FMUs) of the block. The pages in which the controller may determine to store the consolidated logical addresses may include partial FMUs or complete FMUs and may be evenly separated by other pages or FMUs (e.g., next available FMUs in non-contiguous pages for different zones). For instance, in the example of FIG. 8, the controller may determine to store LBAs 1, 2, 3, 4, 74, and 109 for one zone in the page 804 including FMU 5, and the controller may determine to store LBAs 143, 172, 180, 209, 210, and 211 for another zone in the page 804 including FMU 11. Thus, in this example, if the block 802 includes 12 FMUs, the controller may determine for one zone a first page including FMU 5 to store consolidated logical addresses and determine for another zone a second page including FMU 11 to store consolidated logical addresses. Alternatively, the pages may be contiguous pages that are not separated by other pages or FMUs (e.g., in a same zone or even in different zones). For instance, in a variation of the example of FIG. 8, the controller may determine to store consolidated logical addresses 808 for each zone in contiguous FMUs 10 and 11, respectively (rather than in non-contiguous FMUs 5 and 11 as in the illustrated example). Thus, in this example, if the block 802 includes 12 FMUs, the controller may determine for one or more zones a single page including FMU 10 and 11 to store consolidated logical addresses 808.

As represented by block 906, the controller may store, in the one of the FMUs, the logical addresses for the multiple ones of the FMUs in the block. The controller may accumulate the logical addresses in the buffer of volatile memory at block 902 prior to storing the logical addresses in one of the FMUs determined at block 904. In this block and its sub-blocks, the FMUs may be the above-described, first FMUs or second FMUs. For instance, referring to the aforementioned Figures, the controller 123 may accumulate in buffer 125 and afterwards execute a write request to store, in the page 804 including FMU 5 of block 802 (e.g., the first FMU), the consolidated logical addresses 808 from FMUs 0-5 including LBAs 1, 2, 3, 4, 74 and 109, respectively. Similarly, the controller 123 may accumulate in buffer 125 and afterwards execute a write request to store, in the page 804 including FMU 11 of block 802 (e.g., the second FMU), the consolidated logical addresses 808 from FMUs 6-11 including LBAs 143, 172, 180, 209, 210, 211, respectively.

As represented by block 908 (in one example of block 906), the controller may store the logical addresses in the one of the FMUs in response to the buffer of the volatile memory becoming full. For instance, referring to the aforementioned Figures, the controller 123 may store the consolidated logical addresses 808 of LBAs 1, 2, 3, 4, 74, 109 in FMU 5 in response to the buffer 125 becoming filled with these logical addresses from host write commands. For example, the filling of buffer 125 may trigger controller 123 to execute a write request to program the accumulated logical addresses in the page 804 including FMU 5.

As represented by block 910 (in one example of block 906), the controller may store a starting logical address and a logical address range indicating sequential logical addresses in the one of the FMUs. The starting logical address and the logical address range may encompass multiple ones of the FMUs of the block. For instance, the controller may store the starting logical address and the logical address range encompassing multiple ones of the above-described, first FMUs in one of the first FMUs, and the controller may store logical addresses for multiple ones of the above-described, second FMUs in one of the second FMUs. For instance, referring to the aforementioned Figures, the controller 123 may store starting logical address 810 and logical address range 812 indicating sequential logical addresses LBAs 1-4 in FMU 5 (e.g., the first FMU), and the controller may store starting logical address 810 and logical address range 812 indicating sequential logical addresses LBAs 209-211 in FMU 11 (e.g., the second FMU). In this example, LBAs 1-4 may be associated respectively with FMUs 0-3, and LBAs 209-211 may be associated respectively with FMUs 9-11.

As represented by block 912 (in one example of block 906), the controller may store the logical addresses in a same block as the multiple ones of the FMUs. For instance, referring to the aforementioned Figures, the controller 123 may store consolidated logical addresses 808 in block 802, which is the same block as the FMUs 806 associated with the consolidated logical addresses.

As represented by block 914 (in one example of block 906), the controller may store the logical addresses in a different block than the multiple ones of the FMUs. For instance, referring to the aforementioned Figures, the controller 123 may store consolidated logical addresses 808 in a different block than block 802, where block 802 includes the FMUs 806 associated with the consolidated logical addresses.

As represented by block 916 (in one example of block 906), the controller may store additional logical addresses for additional ones of the FMUs of the block in the one of the FMUs (e.g., one of the above-described, first FMUs) or in another one of the FMUs (e.g., one of the above-described, second FMUs). For instance, the controller may store, in the one of the first FMUs, additional logical addresses for additional ones of the first FMUs of the block. For example, referring to the aforementioned Figures, the consolidated logical addresses 808 in a same one of the FMUs 806 may include compressed logical addresses for multiple FMUs and non-compressed, additional logical addresses for additional FMUs. As an example, referring to block 802 of FIG. 8 including first FMUs 0-5, the consolidated logical addresses 808 in FMU 5 may include compressed logical addresses LBAs 1-4 for FMUs 0-3 and additional logical addresses LBA 74 and 109 for additional FMUs 4 and 5. In another example, the controller may store consolidated logical addresses in one of the FMUs 806 for one FMU range and additional logical addresses in another one of the FMUs 806 for a different FMU range. As an example, referring again to block 802 of FIG. 8 including first FMUs 0-5 and second FMUs 6-11, the controller 123 may store consolidated logical addresses 808 for FMUs 0-5 including LBAs 1-4, 74, and 109 in FMU 5 and additional logical addresses for FMUs 6-11 including LBAs 143, 172, 180, and 209-211 in FMU 11.

In one example of block 916, where the additional logical addresses are stored in the one of the FMUs (e.g., one of the above-described, first FMUs), the multiple ones of the FMUs may be associated with sequential logical addresses, and the additional ones of the FMUs may be associated with random logical addresses. For instance, the multiple ones of the first FMUs may be associated with sequential logical addresses, and the additional ones of the first FMUs may be associated with random logical addresses. As an example, referring to block 802 of FIG. 8 including first FMUs 0-5, the consolidated logical addresses 808 in FMU 5 may include sequential logical addresses LBAs 1-4 for multiple FMUs 0-3 and random, additional logical addresses LBA 74 and 109 for additional FMUs 4 and 5.

In one example of block 916, where the additional logical addresses are stored in the another one of the FMUs (e.g., one of the above-described second FMUs), a total size of the additional ones of the FMUs associated with the additional logical addresses may be based on a size of the buffer. For instance, a total size of the multiple ones of the second FMUs may be based on a size of the buffer. As an example, referring again to block 802 of FIG. 8 including first FMUs 0-5 and second FMUs 6-11, the controller 123 may store consolidated logical addresses 808 for FMUs 0-5 including LBAs 1-4, 74, and 109 in FMU 5 and additional logical addresses for FMUs 6-11 including LBAs 143, 172, 180, and 209-211 in FMU 11. In this example, the controller may determine a total size of the second FMUs associated with the additional logical addresses (e.g., an FMU range size or number of FMUs in the second zone including FMUs 6-11) based on a size of buffer 125. For instance, if the controller includes a 48 KB buffer in volatile memory for a 48 MB jumbo block including 12,288 FMUs, then to accommodate the buffer size, the controller may determine to split the jumbo block into two zones (e.g., each having a total size of FMUs or FMU range size of 6,144 FMUs or 24 MB). Similarly, in the example of FIG. 8, the controller may determine to split block 802 in two zones such that the FMU range size is six FMUs (e.g., FMUs 0-5 associated with LBAs 1, 2, 3, 4, 74, and 109 respectively in one zone, and FMUs 6-11 associated with LBAs 143, 172, 180, 209, 210, 211 in another zone) in order to accommodate a given buffer size in controller RAM.

In either example of block 916, the controller may accumulate the additional logical addresses in the buffer in response to host write commands (at block 902) prior to storing the additional logical addresses in the one of the FMUs (e.g., one of the above-described first FMUs) or the another one of the FMUs (e.g., one of the above-described second FMUs). For instance, referring to the aforementioned Figures, the controller 123 may accumulate in buffer 125 and afterwards execute a write request to store, in the page 804 including FMU 5 of block 802 (e.g., the first FMU), the consolidated logical addresses 808 from FMUs 0-5 in one zone including sequential logical addresses 1-4 and additional logical addresses 74 and 109, respectively. Subsequent to storing these consolidated logical addresses in FMU 5, the controller 123 may accumulate in buffer 125 and afterwards execute a write request to store, in the page 804 including FMU 11 of block 802 (e.g., the second FMU), the consolidated logical addresses 808 from FMUs 6-11 in an additional zone including additional logical addresses 143, 172, 180, and 209-211, respectively.

As represented by block 918, in response to a data relocation command, the controller may read the logical addresses (stored at block 906) from the one of the FMUs. For instance, the controller may read from the page including the one of the FMUs (determined at block 904) the logical addresses for the multiple ones of the FMUs of the block. For instance, referring to the aforementioned Figures, in response to data relocation command 612, the controller 123 may read the page 804 including FMU 5 or the page 804 including FMU 11 to identify the consolidated logical addresses 808 associated with FMUs 0-5 or FMUs 6-11 respectively.

As represented by block 920 (in one example of block 918), the controller may read sequential logical addresses from the one of the FMUs in response to the data relocation command. For instance, the controller may read the starting logical address and the logical address range stored at block 910 indicating the sequential logical addresses from the one of the FMUs. In one example following block 910, the controller may read the starting logical address and the logical address range from the one of the above-described, first FMUs during a first data relocation, and the controller may read the logical addresses from the one of the above-described, second FMUs during a second data relocation. For instance, referring to the aforementioned Figures, the controller 123 may read, in response to data relocation command 612, starting logical address 810 and logical address range 812 indicating sequential LBAs 1-4 as well as random LBAs 74, 109 from FMU 5 (e.g., the first FMU) during a first data relocation (e.g., a first iteration of the data relocation process for FMUs 0-5 in a first zone). Similarly, the controller 123 may read, in response to the data relocation command 612, the consolidated logical addresses 808 including LBAs 143, 172, 180, 209-211 from FMU 11 (e.g., the second FMU) during a second data relocation (e.g., a second iteration of the data relocation process for FMUs 6-11 in a second zone).

As represented by block 922, the controller may store the logical addresses read from the one of the FMUs (at block 918) in the buffer of the volatile memory in response to the data relocation command. For instance, referring to the aforementioned Figures, the controller 123 may store the consolidated logical addresses 808 read from one of the FMUs 806 (e.g., FMU 5 in one iteration and FMU 11 in another iteration) in buffer 125 of volatile memory 118 in response to data relocation command 612.

As represented by block 924, the controller may determine at least one of the logical addresses read from the block (at block 918) is mapped to a current FMU in a L2P mapping table (thus verifying data validity). For instance, the controller may determine whether at least one logical address indicated by the starting logical address and the logical address range stored at block 910 is mapped to a current FMU in the L2P mapping table. For example, referring to the aforementioned Figures, the controller 123 may determine that at least one of the consolidated logical addresses 808 read from block 802 is associated with a current FMU in L2P mapping table 120, 205. For instance, the controller may determine whether any of the sequential LBAs 1-4 indicated by starting logical address 810 and logical address range 812 stored in FMU 5 is associated with a current FMU in the L2P mapping table. The controller may determine that a logical address is associated with a current FMU if an address match exists in the L2P mapping table between the physical address currently mapped to the LBA in the L2P mapping table and the physical address of the FMU from which the LBA was consolidated. For instance, in the illustrated example of FIG. 8 where FMU 5 stores consolidated logical addresses 808 including LBA 1 associated with data in FMU 0, the controller may determine an address match exists if the L2P mapping table 120, 205 indicates LBA 1 is currently mapped to FMU 0, while the controller may determine an address mismatch exists if the L2P mapping table indicates that LBA 1 is currently mapped to another FMU other than FMU 0. As an example, referring to FIG. 6, the controller may determine an address match for data B, C, and A', since the logical addresses for B, C, and A' are associated with current FMUs in the mapping table. In contrast, the controller may determine an address mismatch for data A, since the logical address for A is not associated with a current FMU in the mapping table (e.g., the logical address for A is now associated with A' in a different FMU). Thus, the controller may determine data B, C, and A' are valid but data A is invalid based on the consolidated logical addresses 808.

Finally, as represented by block 926, the controller may relocate data stored at the least one of the logical addresses in response to the determination at block 924. For instance, referring to the aforementioned Figures, the controller 123 may relocate data 119 stored in the current FMUs of block 802 associated with consolidated logical addresses 808 in response to determining an address match exists for these logical addresses in the L2P mapping table 120, 205. As an example, referring to FIG. 6, in response to determining an address match for data B, C, and A' (e.g., the logical addresses for B, C, and A' are associated with current FMUs in the mapping table) and an address mismatch for data A (e.g., the logical address for A is now associated with A' in a different FMU), the controller may relocate the valid data B, C, and A' but not invalid data A to a different block than block 802.

Figure 10:
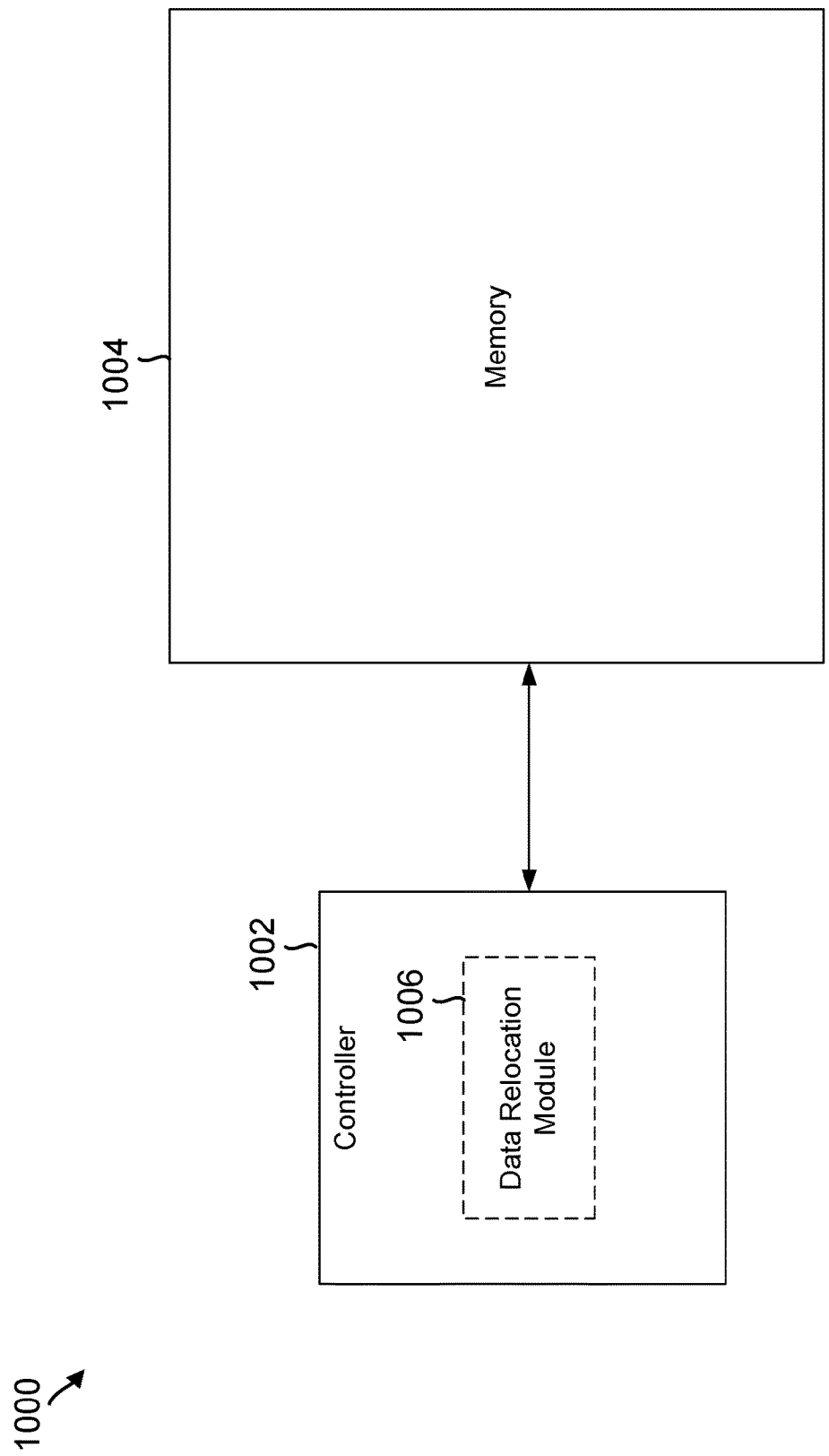
FIG. 10 is a conceptual diagram illustrating an example of a controller that relocates data associated with consolidated logical addresses in an FMU in the storage device of FIG. 1.

FIG. 10 is a conceptual diagram illustrating an example 1000 of a controller 1002 coupled to a memory 1004 in a storage device. For example, controller 1002 may correspond to controller 123 and memory 1004 may correspond to the NVM 110 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1002 includes a data relocation module 1006 that may provide a means for reading logical addresses for multiple ones of FMUs of a block from one of the FMUs of the block in response to a data relocation command. For example, the data relocation module 1006 may perform the process or algorithm described above with respect to FIG. 9.

Advantages. Relocation is inevitable. There are certain folding products where we can only write to SLCs directly. In those products, once the cache is exhausted, we have to do relocations. The SLC cache is fairly small sized compared to the complete capacity. When the SLC cache in NAND is filled up, we have to start relocation. When this happens performance will be degraded. But the invention avoids this degradation. This applies not only to folding products but to any product involving relocation (e.g., compaction/GC), although it significantly improves folding product performance.

Accordingly, the storage device of the present disclosure provides an improved data relocation scanning process which significantly reduces the number of page reads performed during a block relocation scan by consolidating logical addresses for multiple FMUs in a single FMU. As a result, when the controller performs a relocation scan of the block or jumbo block to identify the logical addresses of all FMUs, the controller may simply read the pages including only the FMUs that store the consolidated logical addresses, rather than inefficiently reading every FMU, thereby significantly saving relocation time and power consumption. This improvement to storage device performance may be particularly beneficial in storage devices where data relocation may be prevalent (e.g., folding products which require writes to an SLC cache that, when filled, results in data relocation from SLC blocks to MLC blocks), as well as storage device applications involving data relocation (e.g., garbage collection).

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a non-volatile memory comprising a block including a plurality of pages and a plurality of flash management units (FMUs), wherein each of the pages includes one or more of the FMUs;
a volatile memory; and
a controller configured to store, in one of the FMUs, logical addresses for multiple ones of the FMUs of the block, and to accumulate the logical addresses in the volatile memory in response to host write commands prior to storing the logical addresses in the one of the FMUs,
wherein the controller is further configured, in response to a data relocation command, to read the logical addresses from the one of the FMUs, to determine at least one of the logical addresses read from the block is mapped to a current FMU in a logical-to-physical (L2P) mapping table, and to relocate data stored at the at least one of the logical addresses in response to the determination.

2. The storage device of claim 1, wherein the volatile memory includes a buffer in which the logical addresses are accumulated, and the controller is further configured to store the logical addresses in the one of the FMUs in response to the buffer becoming full.

3. The storage device of claim 1, wherein the volatile memory includes a buffer in which the logical addresses are accumulated, and a total size of the multiple ones of the FMUs associated with the logical addresses is based on a size of the buffer.

4. The storage device of claim 1, wherein the volatile memory includes a buffer in which the logical addresses are accumulated, and wherein the controller is further configured to store the logical addresses read from the one of the FMUs in the buffer in response to the data relocation command.

5. The storage device of claim 1, wherein the controller is further configured to store a starting logical address and a logical address range indicating sequential logical addresses in the one of the FMUs, and to read the sequential logical addresses from the one of the FMUs in response to the data relocation command.

6. The storage device of claim 1, wherein the controller is configured to store the logical addresses in a same block as the multiple ones of the FMUs.

7. The storage device of claim 1, wherein the controller is configured to store the logical addresses in a different block than the multiple ones of the FMUs.

8. The storage device of claim 1, wherein the controller is further configured to determine a page including the one of the FMUs based on a size of the block, and in response to the data relocation command, to read from the page the logical addresses for the multiple ones of the FMUs of the block.

9. The storage device of claim 1, wherein the block is a jumbo block.

10. A storage device, comprising:
a non-volatile memory comprising a block including a plurality of pages and a plurality of flash management units (FMUs), wherein each of the pages includes one or more of the FMUs;
a volatile memory; and
a controller configured to store, in one of the FMUs, a starting logical address and a logical address range encompassing multiple ones of the FMUs of the block, and to accumulate logical addresses indicated by the starting logical address and the logical address range in the volatile memory in response to host write commands prior to storing the starting logical address and the logical address range in the one of the FMUs,
wherein the controller is further configured, in response to a data relocation command, to read the starting logical address and the logical address range from the one of the FMUs, to determine whether at least one logical address of the logical addresses indicated by the starting logical address and the logical address range is mapped to a current FMU in a logical-to-physical (L2P) mapping table, and to relocate data stored at the at least one logical address in response to the determination.

11. The storage device of claim 10, wherein the controller is further configured to store in the one of the FMUs, or in another one of the FMUs, additional logical addresses for additional ones of the FMUs of the block.

12. The storage device of claim 11, wherein the additional logical addresses are stored in the one of the FMUs, the multiple ones of the FMUs are associated with sequential logical addresses, and the additional ones of the FMUs are associated with random logical addresses.

13. The storage device of claim 12, wherein the volatile memory includes a buffer, and the controller is further configured to accumulate the additional logical addresses in the buffer in response to additional host write commands, and to store accumulated logical addresses in the one of the FMUs.

14. The storage device of claim 11, wherein the volatile memory includes a buffer, the additional logical addresses are stored in the another one of the FMUs, and the controller is further configured to accumulate the additional logical addresses in the buffer in response to additional host write commands, and a total size of the additional ones of the FMUs associated with the additional logical addresses is based on a size of the buffer.

15. A storage device, comprising:
a non-volatile memory comprising a block including a first page, a second page, first flash management units (FMUs), and second FMUs, wherein the first page includes the first FMUs and the second page includes the second FMUs;

a volatile memory; and a controller configured to store, in one of the first FMUs, a starting logical address and a logical address range encompassing multiple ones of the first FMUs of the block, to accumulate first logical addresses indicated by the starting logical address and the logical address range in the volatile memory in response to host write commands prior to storing the starting logical address and the logical address range in the one of the first FMUs, and to store in one of the second FMUs, second logical addresses for multiple ones of the second FMUs of the block, wherein the controller is further configured to read the starting logical address and the logical address range indicating the first logical addresses from the one of the first FMUs during a first data relocation, and to read the second logical addresses from the one of the second FMUs during a second data relocation.

16. The storage device of claim 15, wherein the controller is further configured to store, in the one of the first FMUs, additional logical addresses for additional ones of the first FMUs of the block.

17. The storage device of claim 16, wherein the multiple ones of the first FMUs are associated with sequential logical addresses, and the additional ones of the first FMUs are associated with random logical addresses.

18. The storage device of claim 16, wherein the volatile memory includes a buffer, and the controller is further configured to accumulate the additional logical addresses in the buffer in response to additional host write commands, and to store accumulated logical addresses in the one of the first FMUs.

19. The storage device of claim 15, wherein the volatile memory includes a buffer, the controller is further configured to accumulate the second logical addresses for the multiple ones of the second FMUs in the buffer in response to additional host write commands, and a total size of the multiple ones of the second FMUs is based on a size of the buffer.

* * * * *